United States Patent [19]

Heerah

[11] Patent Number: 4,700,228

[45] Date of Patent: Oct. 13, 1987

[54] TELEVISION SPECIAL EFFECTS GENERATOR

[75] Inventor: Atma Heerah, Cambridge, England

[73] Assignee: U.S. Philips Corporation, New York, N.Y.

[21] Appl. No.: 774,419

[22] Filed: Sep. 10, 1985

[30] Foreign Application Priority Data

Sep. 14, 1984 [GB] United Kingdom ............... 8423325

[51] Int. Cl.$^4$ ............................................. H04N 5/14
[52] U.S. Cl. ..................................... 358/160; 358/22
[58] Field of Search .............. 358/22, 160, 180, 182, 358/183, 21 R, 166, 37; 340/729

[56] References Cited

U.S. PATENT DOCUMENTS 4,011,401  3/1977  Presti ................................. 358/160
4,220,965  9/1980  Heitmann et al. ................... 358/22

FOREIGN PATENT DOCUMENTS 0022830  2/1977  Japan ................................. 358/22

Primary Examiner—Tommy P. Chin
Assistant Examiner—David E. Harvey
Attorney, Agent, or Firm—Thomas A. Briody; William J. Streeter; Gregory P. Gadson

[57] ABSTRACT

A television special effects generator operating on digitally encoded video signals is disclosed. The generator includes a frame store, input addressor and output addressor. The input addressor means is controlled to write picture information into the frame store in a desired manner while the output addressor includes an up/down counter whose count direction can be reversed when a given count is reached. By reversing the up/down counter count direction part way through a line or field scan, the displayed picture appears in two parts, one being the mirror image of the other.

9 Claims, 6 Drawing Figures

TELEVISION SPECIAL EFFECTS GENERATOR

BACKGROUND OF THE INVENTION

The invention relates to a television special effects generator comprising: an input for receiving a video signal in the form of successive samples encoded in digital form and corresponding to picture elements on display, the display being built up from line and field sequential scans; a frame store for storing video signals forming a television frame; input addressing means for writing the input video signal samples into desired locations in the store; output addressing means for reading video signal samples from selected locations in the store; and an output coupled to the store for receiving successive video signal samples read from the store as the output video signal; in which the output addressing means is capable of generating read address signals which cause the store locations to be read in a sequence which corresponds to incrementally increasing (or decreasing) picture lines in a television field until a given point is reached and then incrementally decreasing (or increasing) picture lines; characterized in that for alternate television fields the stepping of the output addresses is inhibited for one line period when the given point is reached.

Such special effects generators are normally capable of expanding (zooming) and compressing (squeezing) a television picture and of moving the picture to selected parts of the display screen. They may also be capable of causing multiple pictures to be displayed and of rotating a picture about an axis perpendicular to the plane of the picture and one or more axes in the plane of the picture. Such generators have also been used for displaying a reversed picture which, if a squeeze-zoom action is combined with a picture direction reversal, can produce an effect in which the picture appears to "flip" like a card being turned over. These effects are produced by appropriate control of the write and read addresses of the frame store which are normally controlled by means of counters. A reflection effect has been produced by mixing a picture with a reversed picture and ensuring that the center line matches. This gives a mirror image of the left hand side of the screen in the right hand side. This effect is, however, complicated to set up and requires a two channel mixer for its achievement.

U.K. Pat. No. 1583928 discloses a television effects generator in which the output addressing means comprises up/down counters whose counting directions are reversed to produce a mirror effect. This provides a simple means for producing a mirror image of one half of the displayed picture in the other half of the displayed picture. All that is required is a simple instruction to the read address generator to reverse its sequence of addresses when a given point is reached to cause samples from the store to be read out in reverse order. Thus the need for two channels to produce this effect is eliminated.

However, a straight reversal of the addresses produced by the address generator causes a jagged edge to be produced on diagonal lines. This could apparently be overcome by causing the fields to be read in reverse order but this causes one field to be read in one part of the picture and the other field in the other part of the picture. This is not noticeable, if there is no motion in the picture, but if there is motion in the picture it manifests itself as movement in one part lagging that in the other part and is particularly noticeable at the boundary between the two parts.

SUMMARY OF THE INVENTION

It is an object of the invention to enable the provision of a television special effects generator which is capable of providing an output which produces on display a picture having one portion reflected in another portion.

The invention provides a television special effects generator as set forth in the opening paragraph characterized in that for alternate television fields the stepping of the output addresses is inhibited for one line period when the given point is reached.

The simple inhibition of the address generator for one line period in alternative fields ensures that after reversal of the address generator the same field is read from the store as before reversal.

The output addressing means may be capable of generating read address signals which cause the store locations to be read in a sequence which corresponds to incrementally increasing (or decreasing) picture element positions along a television line until a given point is reached and then incrementally decreasing (or increasing) picture element positions, characterized in that the stepping of the output addressing means is inhibited for one sampling period when the given point is reached.

When the video signal comprises a first data stream representing the luminance component and a second data stream comprising multiplexed components representing color difference components Cr and Cb, means may be provided for advancing one color difference component by one sampling period and delaying the other color difference component by one sampling period after the given point is reached.

This is desirable when the color difference signals are stored in a common store in interleaved fashion since normal reading from the store would reverse the order of the Cr and Cb components after the reversal of the generated addresses causing complementary colors to be produced on either side of the reversal.

Means may be provided to vary the given point. This enables the line about which the picture is reflected to be positioned at any selected vertical or horizontal position on the picture.

Means may be provided for expanding the television picture represented by the video signal after the given point has been reached. This enables the whole of the diplay screen to be filled when the reflection takes place about a line not on the picture center line.

The television special effects generator may be characterized in that the output addressing means comprises a first up/down counter which is clocked at the sampling rate and which is controlled to reverse its count direction when a given count has been reached and/or a second up/down counter which is clocked at the television line rate and which is controlled to reverse its count direction when a given count has been reached.

This provides a simple way of reversing the sequence of addresses generated by the address generator.

The first and/or second up/down counters may be presetable to a desired initial count state.

This enables any selected portion of the store to be accessed at the beginning of a picture line or picture field.

BRIEF DESCRIPTION OF THE DRAWINGS

An embodiment of the invention will now be described, by way of example, with reference to the accompanying drawings, in which.

DETAILED DESCRIPTION OF THE INVENTION

Figure 1:
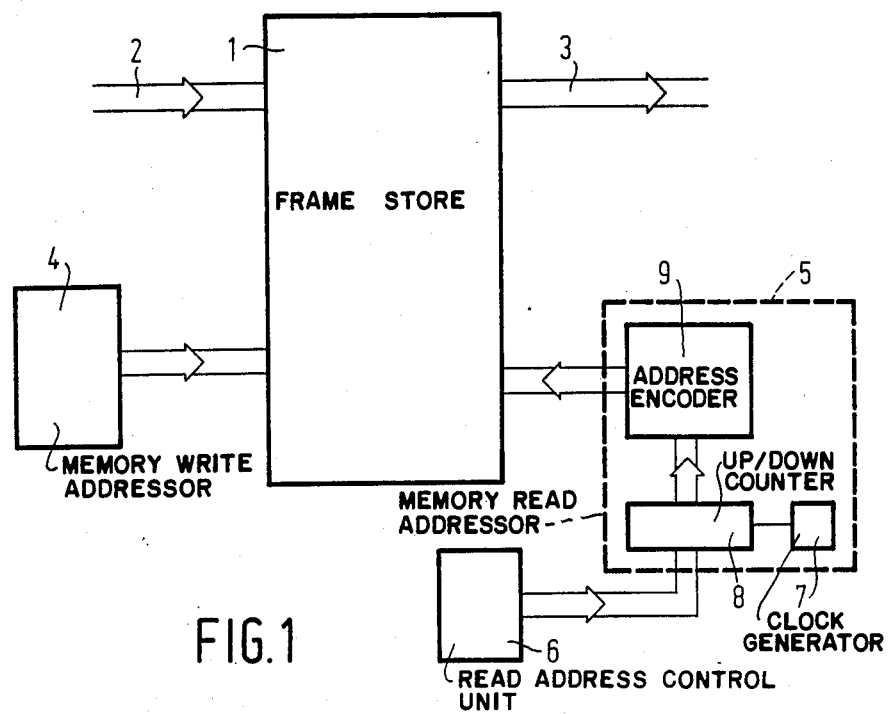
FIG. 1 shows in block schematic form a television special effects generator according to the invention.

The special effects generator shown in block schematic form in FIG. 1 comprises a frame store 1 in the form of a random access memory, an input highway 2 for conveying an input video signal in the form of two 8 bit PCM words, one for luminance at a sampling rate of 13.5 MHz and one for two interleaved color difference signals at a sampling rate for each color difference signal of 6.75 MHz giving a multiplexed 13.5 MHz sampling rate, and output highway 3 for conveying an output video signal, a memory write addressor 4, a memory read addressor 5, and a read addressor control unit 6. The read addressor 5 comprises a clock generator 7, an up/down counter 8 and an address encoder 9. The write addressor 4 is similar to the read addressor 5 but may have a unidirectional counter instead of the up/down counter 8.

In operation the video input signal samples on the highway 2 written into selected locations in the frame store 1 under the control of the write addressor 4. The stored samples are then read out under the control of the read addressor 5 onto the highway 3 to form the output video signal. When it is desired to produce a so-called mirror effect, i.e., for one half of the picture displayed to be a mirror image of the other half, the control unit 6 produces a signal which causes the up/down counter to change count direction when a given, pre-set, count is reached. Conveniently, this count corresponds to the mid point of the picture in either or both of the horizontal and vertical directions. The up/down counter 8 is constructed as two separate counters, the first clocked at the sampling rate and the second at the television line rate. Thus the first given count determines a vertical line about which the picture is mirrored and the second determines a horizontal line about which the picture is mirrored. The control unit 6 thus includes a selection means for selecting whether or not a mirror effect is desired in the horizontal and/or vertical direction. If so it compares the counter output with a pre-set count and causes reversal of the count direction of the counter when that count has been reached. The up/down counters may be presettable so that a picture reversal can be effected by presetting the counters to a maximum count and causing them to count down either to zero or, if the mirror effect is required, to a given count before reversing and counting up.

Figure 2:
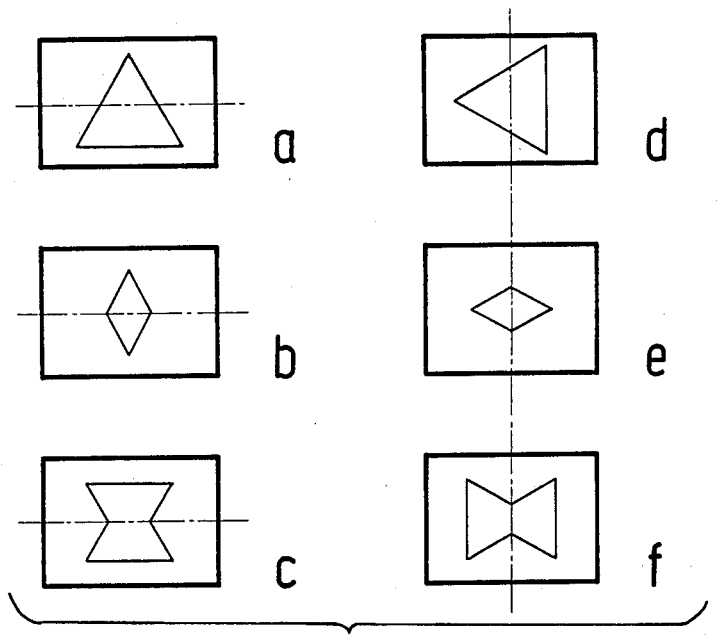
FIG. 2 illustrates effects which may be produced by reversing the picture from a given line by use of the generator of FIG. 1.
Figure 3:
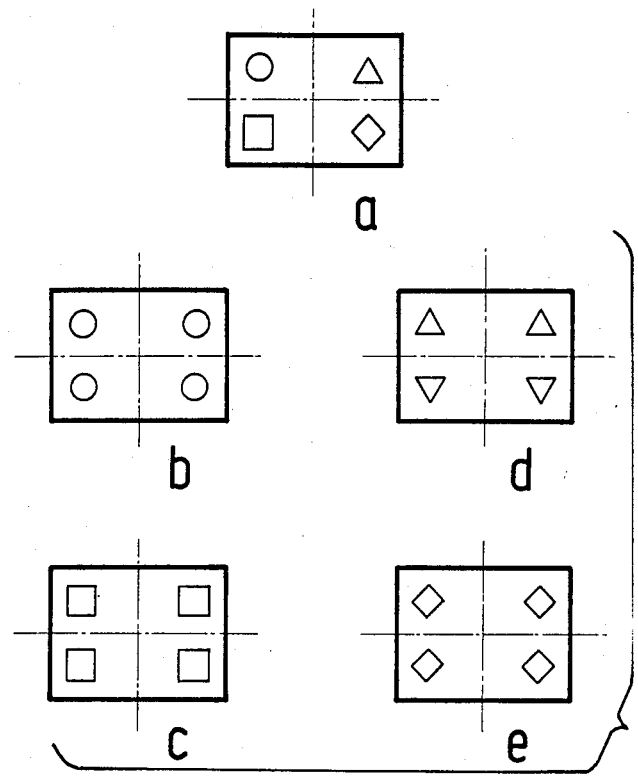
FIG. 3 illustrates effects which may be produced by reversing the picture from given lines extending horizontally and vertically by use of the generator of FIG. 1.

FIGS. 2 and 3 illustrate the effects obtainable by generating the read addresses for the frame store 1 by means of addressors including up/down counters. FIGS. 2(a) and 2(d) show a picture produced normally i.e. both up/down counters are arranged to count up from zero to the maximum count. FIG. 2(b) shows the effect produced when the up/down counter clocked at the line frequency is arranged to count up from zero to a given count (in this case to a count corresponding to the center line of the picture) and then count down to zero. FIG. 2(c) shows the effect when the up/down counter is preset to the maximum count value and is caused to count down to the given count and then to count up back to the preset maximum count. In FIGS. 2(b) and 2(c) the counter clocked at the sample rate is assumed to count up from zero to the maximum count. FIGS. 2(e) and 2(f) illustrate the corresponding effects when the sample rate clocked counter counts up from zero to the given count and then reverses and when it is preset to its maximum count and counts down to the given count and then reverses. Again with FIGS. 2(e) and 2(f) it is assumed that the line rate clocked counter merely counts up from the zero count during each field.

FIG. 3 illustrates the effects produced when both up/down counters are reversed at a given count. For FIG. 3(b) both counters start from the zero count, for FIG. 3(c) the line rate clocked counter starts from a preset maximum count and the sample rate clocked counter starts from zero, for FIG. 3(d) the line rate clocked counter starts from zero and the sample rate clocked counter starts from a preset maximum count, and for FIG. 3(e) both the line rate and sample rate clocked counters start from a preset maximum count. As can be seen from FIG. 3 these conditions determine the portion of the picture which is reflected.

Further effects may be produced by pre- or post-processing of the video signal. For example, if a rotator is connected before the frame store and the effect illustrated in FIG. 3 is selected a combined effect simulating a kaleidoscope can be obtained. If a rotator is connected after the frame store a completely different effect is produced since this would result in the total picture being rotated together rather than the four quadrants being separately rotated.

Figure 4:
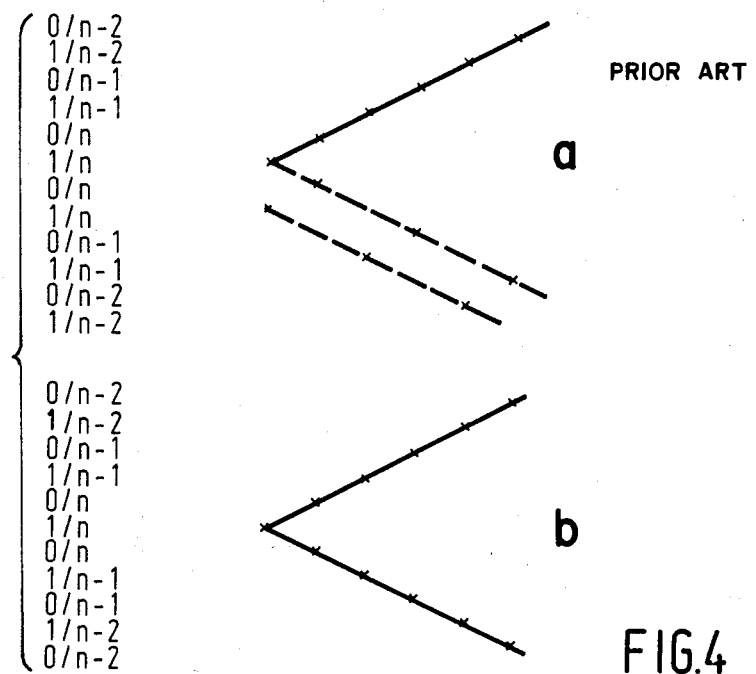
FIG. 4 illustrates problems involved when using interlaced fields.

While the basic inventive idea is to use up/down counters in the store read addressor a number of precautions have to be taken to enable the best performance to be achieved. FIG. 4 illustrates the problems involved with the reversal of the up/down counter clocked at line rate. In FIG. 4 the crosses represent samples corresponding to a diagonal line on the picture on lines n−2, n−1, n, n+1, n+2 of a picture where n is the line about which the mirror effect is to be produced. It is assumed that the television picture, as is normal, is assembled from two interlaced fields 0 and 1. As can be seen from FIG. 4(a) if the counter is inhibited for one clock pulse at the time of reversal to give an accurate mirror effect then the reflected part of the signal has the field samples apparently reversed given a jagged line. At first sight it would seem that this problem could be overcome by reversing the fields when the counter is reversed. However, this is unsatisfactory because of temporal effects and in practice if this step is taken and a picture containing movement is displayed one half moves before the other. The solution to this problem is illustrated by means of FIG. 4(b). If the counter is inhibited for one line pulse on one field (field 0) and not for the other field (field 1) the field sequence is maintained and the jagged line effect is removed. The small divergence from a perfect mirroring caused by not repeating line n of field 1 is not generally noticeable.

There is a similar problem with respect to the sample rate clocked counter if a frame store is used in which the color difference components Cr and Cb are stored and read out in multiplexed form following the sequence Cr, Cb, $Cr_2$, $Cb_2$, ... $Cr_n$, $Cb_n$. This problem can be illustrated as follows. If the sample number at which the count reverses is m then the samples read onto the output highway 3 will be in the following sequence $Cr_{(m-1)}$, $Cb_{(m-1)}$, $Cr_m$, $Cb_m$, $Cb_m$, $Cr_m$, $Cb_{m-1}$, $Cr_{(m-1)}$. However the rest of the system recognizes the interleaved Cr and Cb components in the sequence Cr,Cb,Cr,Cb, etc. only. Hence after the mirror point m the Cr and Cb components are interchanged and hence complementary colors will be reproduced in the mirror image.

Figure 5:
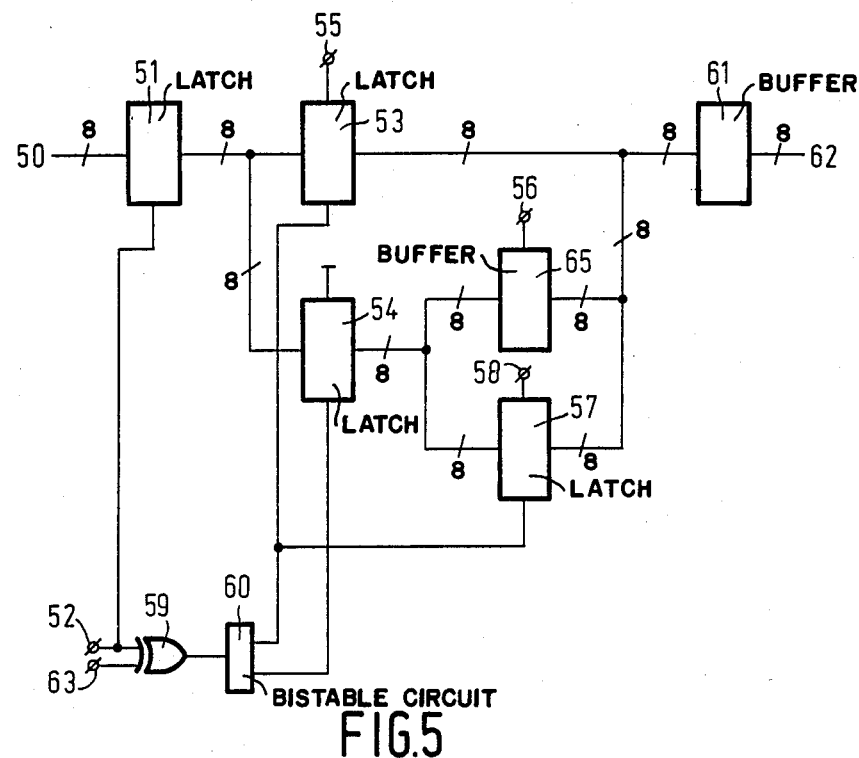
FIG. 5 shows in block schematic form an arrangement for ensuring the correct sequence of color difference signals on picture reversal.

FIG. 5 shows an arrangement for correcting the positions of the Cr and Cb components. In FIG. 5 those lines having a diagonal slash through them represent 8 bit parallel highways, the other lines representing single signal paths. An input 50 is connected to an 8 bit latch 51 which is clocked at the sample rate from clock pulses applied to an input 52. The output of the latch 51 is fed to two further latches 53 and 54. The latch 53 has its output enabled by a signal applied to input 55, the signal being of the form illustrated in FIG. 6(a). The latch 54 is permanently enabled. The output of latch 54 is fed to a buffer 65 which is enabled by a signal at input 56 which takes the form illustrated in FIG. 6(d) and to a latch 57 which is enabled by a signal at input 58 which takes the form illustrated in FIG. 6(e). The input 52 is also connected to a first input of an exclusive OR-gate 59 whose output is connected to the clock input of a D-type bistable circuit 60 which provides clock signals to the latches 53, 54 and 57 at half the sample rate, the clock signal to the latch 54 being in antiphase to the clock signal to the latches 53 and 57. The outputs of the latches 53, 55 and 57 are fed via a buffer 61 to an output 62. An invert signal is applied to input 63 which causes the phase of the clock outputs from the bistable 60 to be reversed when it changes state. The latches 51, 53, 54, 57 are tri-state latches and may be type 74 LS 374 TTL integrated circits while the buffer 55 also has a tri-state output and may be a type 74 LS 244 integrated circuit.

Figure 6:
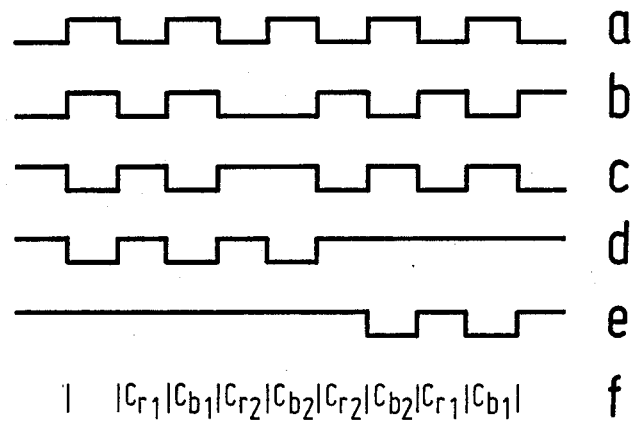
FIG. 6 shows waveforms of various signals in the arrangement of FIG. 5.

The arrangement shown in FIG. 5 effectively advances the Cb sample by the sample clock period and retards the Cr sample by the sample clock period when the given count is reached by causing the clock signals to be inverted by applying a signal to input 63 which via the exclusive OR gate 59 inverts the sample clock applied to the clock input of the bistable 60. The change in clock signals is shown in FIGS. 6(b) and (c), FIG. 6(b) showing the signal applied to latches 53 and 57 and FIG. 6(c) showing the signal applied to latch 54. At the same time the enable signals to the latch 57 and buffer 65 cause the Cr signal to pass via the latch 57 rather than the buffer 65. Thus as shown in FIG. 6(f) the Cr, Cb sequence is maintained.

With the arrangement as described thus far the luminance component after the mirror point is so timed that a one sample period error between the luminance and color difference components is produced. Thus on sharp edges there is a one sample period delay between the change in chrominance and the corresponding change in luminance which may give rise to false colors on sharp transitions. This may be overcome by reducing the delay in the luminance path by one sampling period when the given count is reached. This can be achieved simply by bypassing a latch which is clocked at the sampling rate.

It is not essential that the picture reversal, or mirroring is produced about a horizontal or vertical center line. If the horizontal or vertical line is not centrally placed but is placed towards the originating edge than a gap will appear at the other edge unless the mirrored portion is expanded. Similarly if the one is nearer to the mirrored edge part of the picture will be missing from the mirrored portion. The mirror lines need not be vertical or horizontal if the counters are preset more than once per field. The mirror line may be made continuously adjustable by including a potentiometer control, analog-to-digital converter and an adder in the path to set the given count.

The memory read addressor need not comprise an up/down counter, although this gives a convenient implementation. For example, a unidirectional counter may be used to address a read only memory encoder which is programmed to produce an address reversal at a given count of the unidirectional counter. This would, however, have the disadvantage of being an address generator capable of only producing a mirror effect whereas by using an up/down counter a normal addressing function can be produced by not causing the up/down counter to reverse when the given count is reached. This can be easily achieved by a selection switch and simple logic circuitry.

The memory write addressor 4 may be controlled completely independently of the memory read addressor 5 and consequently effects such as compression, expansion and rotation may be performed using the memory write addressor 4 and combined with the mirror effect using the memory read addressor 5.

I claim:

1. A television special effects generator comprising: an input for receiving an input video signal in the form of successive samples encoded in digital form and corresponding to picture elements on display, the display being built up from sequential picture line and field scans; a frame store for storing said input video signal in the form of a televison frame; input addressing means for writing the successive samples into desired locations in the store; output addressing means for reading said successive samples from selected locations in the store; and an output coupled to the store for receiving said successive samples read from the store as an output video signal; said output addressing means is capable of generating read address signals which cause the selected store locations to be read in a sequence which corresponds to incrementally advancing in one direction, picture lines in a television field until a predefined picture line is reached and then incrementally advancing said picture lines in the opposite direction; characterized in that only for alternate television fields the reading of the output addresses is inhibited for a period of time required to sample one picture line when the predefined picture line is reached.

2. A television special effects generator as claimed in claim 1, in which the output addressing means generates read address signals which cause the selected store locations to be read in a sequence which corresponds to incrementally advancing in one direction, picture element positions along a television line until a predefined picture element position is reached and then incrementally advancing in the opposite direction, picture element positions, characterized in that the reading of the output addresses is inhibited for a period of time required to sample one picture element when the predefined picture element position is reached.

3. A television special effects generator as claimed in claim 2, characterized in that the input video signal comprises a first data stream representing a luminance component and a second data stream comprising multiplexed data representing color difference components Cr and Cb and that means are provided for advancing one color difference component by a period of time required to sample one picture element and delaying the other color difference component by a period of time required to sample one picture element after the predefined picture element position is reached.

4. A television special effects generator as claimed in any preceding claim, characterized in that the predefined picture line is variable.

5. A television special effects generator as claimed in any one of claims 1-3, characterized by means for expanding the display represented by the output video signal after the predefined picture line has been reached.

6. A television special effects generator as claimed in any one of claims 1-3, characterized in that the output addressing means comprises a first up/down counter which counts in a direction at a rate at which picture elements are sampled and which is controlled to reverse its count direction when a first predefined count has been reached and/or a second up/down counter which counts at the rate at which picture lines are sampled and which is controlled to reverse its count direction when a second predefined count has been reached.

7. A television special effects generator as claimed in claim 6, characterized in that the first and/or second up/down counters are presettable to a desired initial count state.

8. A television special effects generator as claimed in claim 2 or 3, characterized by means for expanding the display represented by the output video signal after the predefined picture element position has been reached.

9. A television special effects generator as claimed in claim 2 or 3, characterized in that the predefined picture element position is variable.

* * * * *